(12) United States Patent
McManus et al.

(10) Patent No.: US 8,255,017 B2
(45) Date of Patent: Aug. 28, 2012

(54) SYSTEMS, METHODS AND DEVICES FOR CONVERGENT COMMUNICATIONS

(75) Inventors: Craig Edward McManus, Fayetteville, NC (US); Melvin Warren Marker, Fayetteville, NC (US); Jeffrey Michael Adelman, Oxford, MD (US); Michael E. Bowser, Gaithersburg, MD (US)

(73) Assignee: By Light Professional IT Services, Arlington, VA (US)

( * ) Notice: Subject to any disclaimer, the term of this patent is extended or adjusted under 35 U.S.C. 154(b) by 330 days.

(21) Appl. No.: 12/620,274

(22) Filed: Nov. 17, 2009

(65) Prior Publication Data

US 2011/0117957 A1      May 19, 2011

(51) Int. Cl.
*H04Q 7/32* (2006.01)

(52) U.S. Cl. .......... 455/575.1; 455/550.1; 455/90.3; 455/500; 455/90.1; 370/401; 370/328; 370/329; 370/343

(58) Field of Classification Search .......... 455/557, 455/575.1, 550.1, 90.1, 90.3, 500, 517, 508, 455/509, 426.1–426.2, 461, 422.1, 403, 414.1–414.4, 455/445; 370/401, 328, 329, 343
See application file for complete search history.

(56) References Cited

U.S. PATENT DOCUMENTS

| 2007/0135120 A1* | 6/2007 | King et al. | 455/426.2 |
| 2009/0296918 A1* | 12/2009 | Becker | 379/219 |
| 2010/0150122 A1* | 6/2010 | Berger et al. | 370/338 |
| 2010/0177076 A1* | 7/2010 | Essinger et al. | 345/207 |

\* cited by examiner

*Primary Examiner* — Keith Ferguson
(74) *Attorney, Agent, or Firm* — Gilberto M. Villacorta; Matthew A. Smith; Foley & Lardner LLP

(57) ABSTRACT

Systems, devices and methods for convergence of a variety of communication sources are presented. More particularly, embodiments relate to a radio communications gateway device and associated methods, that is lightweight, small, portable, secure, and useful for converging communications via handheld radios to an internet protocol network having a variety of different available media. The device preferably has a weight under 15 pounds and sufficient interconnectability to be field-useful in a variety of situations.

21 Claims, 18 Drawing Sheets

SYSTEMS, METHODS AND DEVICES FOR CONVERGENT COMMUNICATIONS

FIELD OF THE APPLICATION

The present application relates to the field of communications. More particularly, the present application relates to systems, methods and devices for converging a variety of communications media. Still more particularly, aspects of the present application relate to systems, methods and devices for integrating various types of communications with highly portable radio communications. Still more specifically, certain aspects relate to the convergence of communications systems with radio communications suitable for use in remote areas or in difficult terrain, for example, communications for military operations. Devices of the present application include radio communications gateway devices as described below.

SUMMARY

In one aspect of the present application, portable radios are able to communicate with a variety of communications media, such as analog telephones or circuit-switched networks, Packet radio communications media IP networks, internet communications; TCP/IP network communications; packet or frame-based networks using other protocols; serial (e.g., RS-232, USB) communications; satellite communications, etc. In the present application, the term "communications medium" implies a system for exchanging, providing or receiving information that uses a known set of rules or protocols. There are a wide variety of communications media possible.

A user of a portable or even handheld radio may be using the radio because of the user's surroundings. These surroundings may be geographically remote, without ready access to modern communications, unfamiliar, such that modern communications media can not be located or operated, or insecure, such that existing modern communications are not trustworthy. Users may also be operating in such a fashion that it is not convenient to access modern communications.

There are, however, a wide variety of resources that could be useful to such users. Such resources include, but are not limited to, the ability to speak or otherwise communicate with people or systems outside of the range of the radio system. Such resources are often provided over communications media that, for the foregoing reasons, are not easily accessible.

The inventors have thus perceived a need for a system that can be used to integrate portable radio communications with other types of communications. Because of the environment within which users of radios may be operating it is desirable that the system comprise a device that is small, lightweight, portable, field-deployable and which has a minimum of external components, such as cables.

One specific embodiment relates to a radio communications gateway device, comprising a housing having integrated connectors, the connectors including at least two telephony port connectors, at least one general-purpose serial port connector, at least four network port connectors, and at least four radio interface port connectors; wherein each of the connectors is configured to facilitate communication signals; at least one processor; the at least one processor configured to execute instructions recorded in a memory, such that a first communications medium interfacing with one type of connector can communicate with a second communications medium interfacing with a second type of connector; wherein the housing fits within one rack unit; and wherein the radio communications gateway device weighs less than 15 pounds. Preferably, a height of a rack unit is 1.75 inches, and a width is 23 inches or less, and still more preferably, a width of a rack unit a width is 19 inches or less. Optionally, a depth of a rack unit is 40 inches or less, and the device weighs less than 9 pounds.

In some embodiments, the integrated connectors include at least four telephony port connectors, at least two USB connectors, at least eight network port connectors, at least four radio interface port connectors, and at least one console port connector. In others, the integrated connectors include at least four telephony port connectors, at least two USB connectors, at least eight network port connectors, at least eight radio interface port connectors, and at least one console port connector.

Optionally, the device further comprises a removable persistent storage device.

Preferably, the instructions comprise a LINUX-based operating system, and may further comprise at least two additional components in socket-based communication via a LINUX-based IP stack, a virtual machine configured to run a WINDOWS-based operating system, a management server that is configured to run on the WINDOWS-based operating system, a Web server component configured to operate on the WINDOWS-based operating system configured to run in the virtual machine, a Web server component configured to operate on the LINUX-based operating system, wherein the Web server configured to run on the LINUX-based operating system is further configured to provide a user interface that presents an abstraction of a radio control interface. Preferably, the Web server configured to run on the LINUX-based operating system is further configured to communicate, via the LINUX-based operating system, with a radio control module that is configured to translate information relating to the abstraction of a radio control interface to the requirements of a specific radio control interface.

Optionally, the processor is provided on a board comprising a fixed number of PCI slots and a fixed number of USB slots, and wherein a USB-PCI emulator is connected to at least one of the USB slots.

DETAILED DESCRIPTION OF THE PREFERRED EMBODIMENTS

Figure 1:
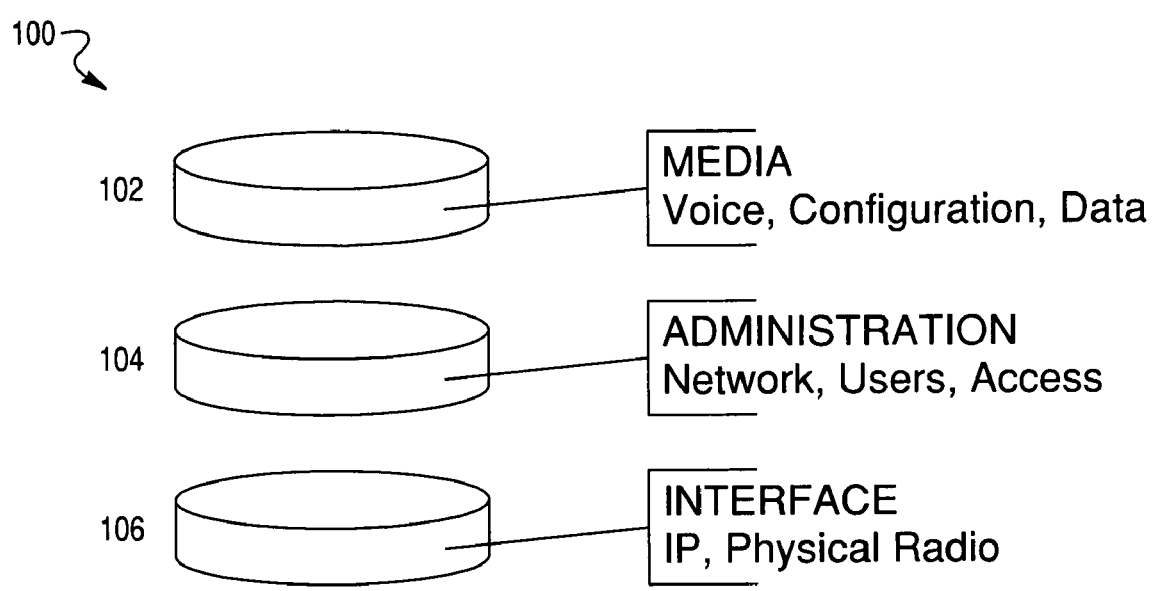
FIG. 1 shows a conceptual view of three levels of a system of a type envisioned for communication according to the present application.

The systems, methods and devices of the present invention comprise generally automated systems for radio communications, in particular, the confluence of radio communications with packet-switched networks such as IP networks. Such systems, methods and devices are envisioned to be carried out on a computer system, which may comprise one or more integrated circuit or other processors that may be programmable or special-purpose devices. The system can comprise memory which may be one or more devices, which may be persistent or non-persistent, such as dynamic or static random access memories, flash memories, electronically erasable programmable memories, or the like, having instructions embedded therein, such that if executed by a programmable device, the instructions will carry out methods as described herein to form systems and devices having functions as described herein.

In the context of the present application, a "radio communications gateway device" means a device that facilitates the communication of portable radio devices with other forms of communications.

A "housing" is a physical enclosure, which may be made of metal, plastic or the like, for one or more functional components. A "housing" may have a number of external access points, such as externally accessible connectors, switches, fasteners or access ports integrated into the housing. The term "integrated," when used to refer to physical objects, means that the objects are connected, and constructed to have the appearance of fitting together closely. When used to described concepts, "integrated" means "included in" or "part of." The term "connector" is used to mean a hardware plug, meant to match a corresponding hardware plug to continue a connection.

A "telephony port" is a place to access a telephone circuit.

A "general-purpose serial port" is a place to access general purpose serial communications hardware. Examples of such communications can include USB (Universal Serial Bus), Firewire and RS-232, among others. In the context of the present application, the term "serial port" should not be limited to RS-232 communications.

The term "network port" means a place to access packet-based network communications, such as Ethernet or other LAN communications.

The term "radio interface port" means a place to access communications with a portable radio. Such communications can proceed using RS-232 or other protocols, but are designed to include a physical radio device as a communications partner.

The term "communication signals" generally means signals carried by a medium, such as the electromagnetic spectrum, whether over a wire, through the air, etc. Such communication signals by be interpreted as analog or digital, may be packet or frame-based, may be multiplexed in frequency, time, code or the like, and may include multiple levels of control information.

The term "interface," when used as a verb, means to exchange communications in an agreed-upon manner, or to physically match components in an agreed-upon manner.

The term "rack unit" means a physical storage unit size that has recognized standard dimensions, although more than one set of dimensions is possible (i.e., there may be more than one standard).

FIG. 1 shows a conceptual view of three levels of a system 100 of a type envisioned for communication according to the present application. System 100 is represented by conceptual layers 102, 104 and 106. Various users of the system 100 will preferably have access to different facilities within the system that are grouped into conceptual layers, depending on the responsibilities of the particular users. For example, standard communications users may only need access to a few aspects of the system, whereas administrative users and technicians may need access to more of the system, or the entire system. Various conceptual layers and protocols are used to separate data useful to converge different communications media types.

Conceptual layer 106 reflects the physical communications media of the system, together with communication protocols used by those media, which are largely transparent to communications users of the system, but can be made accessible to administrative users of the system.

Conceptual layer 104 is an administrative layer, which depends on protocols used in the physical communications media layer 106. The administrative layer 104 comprises facilities for managing lists of users and access privileges, security, software updates and other administrative activities.

Conceptual layer 102 represents various forms of communication data that can be carried by the system. Users able to access conceptual layer 102 can use the system to communicate with one another.

In a packet-based embodiment, the order stacking of layers 102, 104 and 106 can represent the order in which information is transmitted. For example, communications data (layer 102) can comprise voice data. A one-minute recording of someone's voice can be broken up into numerous smaller segments, represented digitally. An example is shown in FIG. 14.

Figure 14:
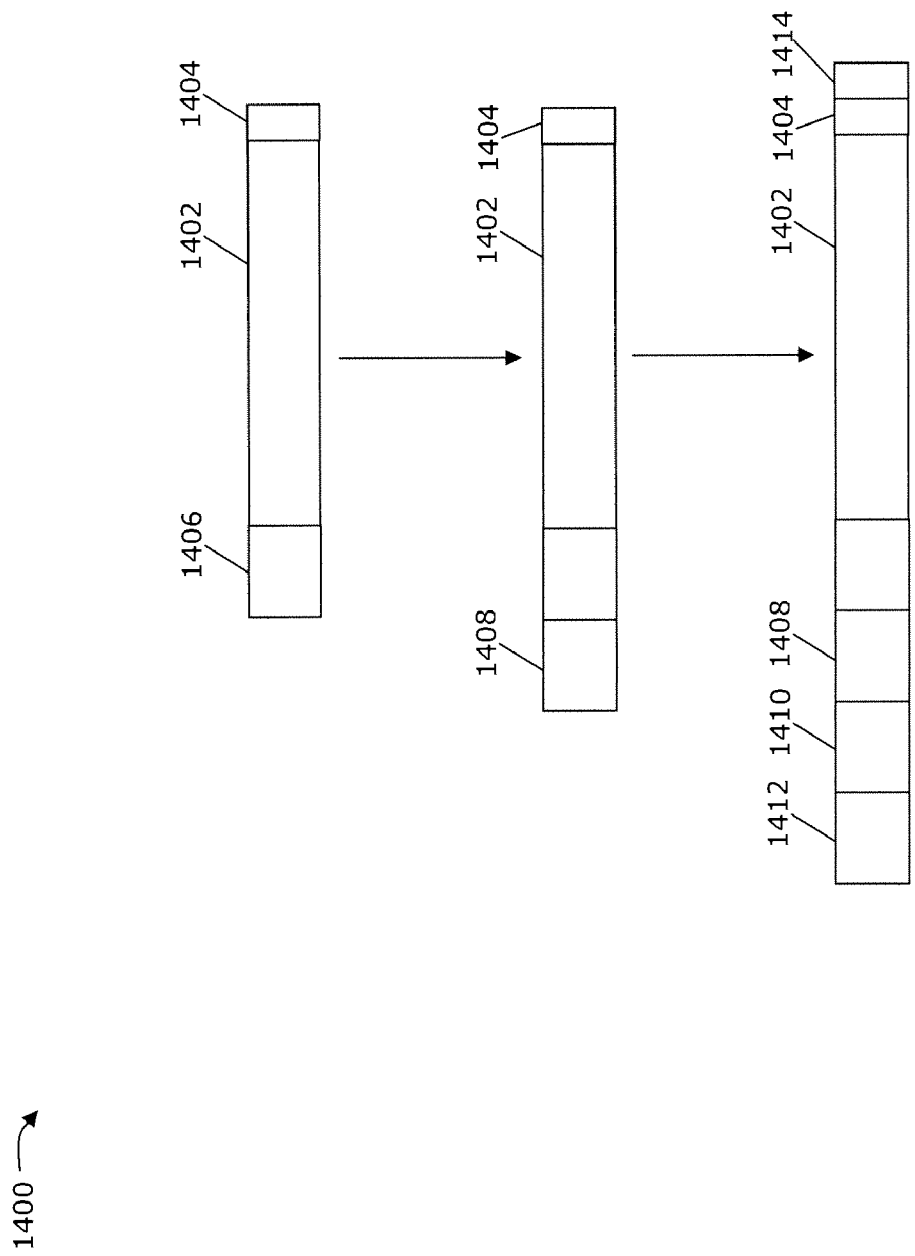
FIG. 14 illustrates a digital voice segment.

FIG. 14 illustrates a digital voice segment 1402. Within the conceptual layer 102 of FIG. 1, too this segment of data 1402, information 1404 and 1406 can optionally be added. Information 1404 can be, for example, control information that indicates where in the entire one-minute recording this particular segment of voice data occurs. Information 1404 can be, for example error correction data if the transmission is particularly noisy and high-quality is required.

Within the conceptual layer 104 of FIG. 1, further data 1408 and 1410 of FIG. 14 can optionally be added. Data 1408 might be security-related data, for example, data related to transmission encryption or access-related data, for example, relating to a particular set of users who are allowed to access data.

Within conceptual layer 106 of FIG. 1, data 1410, 1412 and 1414 can optionally be added. Data 1410 can reflect information used by various communications protocols, such as UDP or TCP and IP. Data 1412 can optionally be data related to a lower-level physical protocol, such as framing data.

Figure 2:
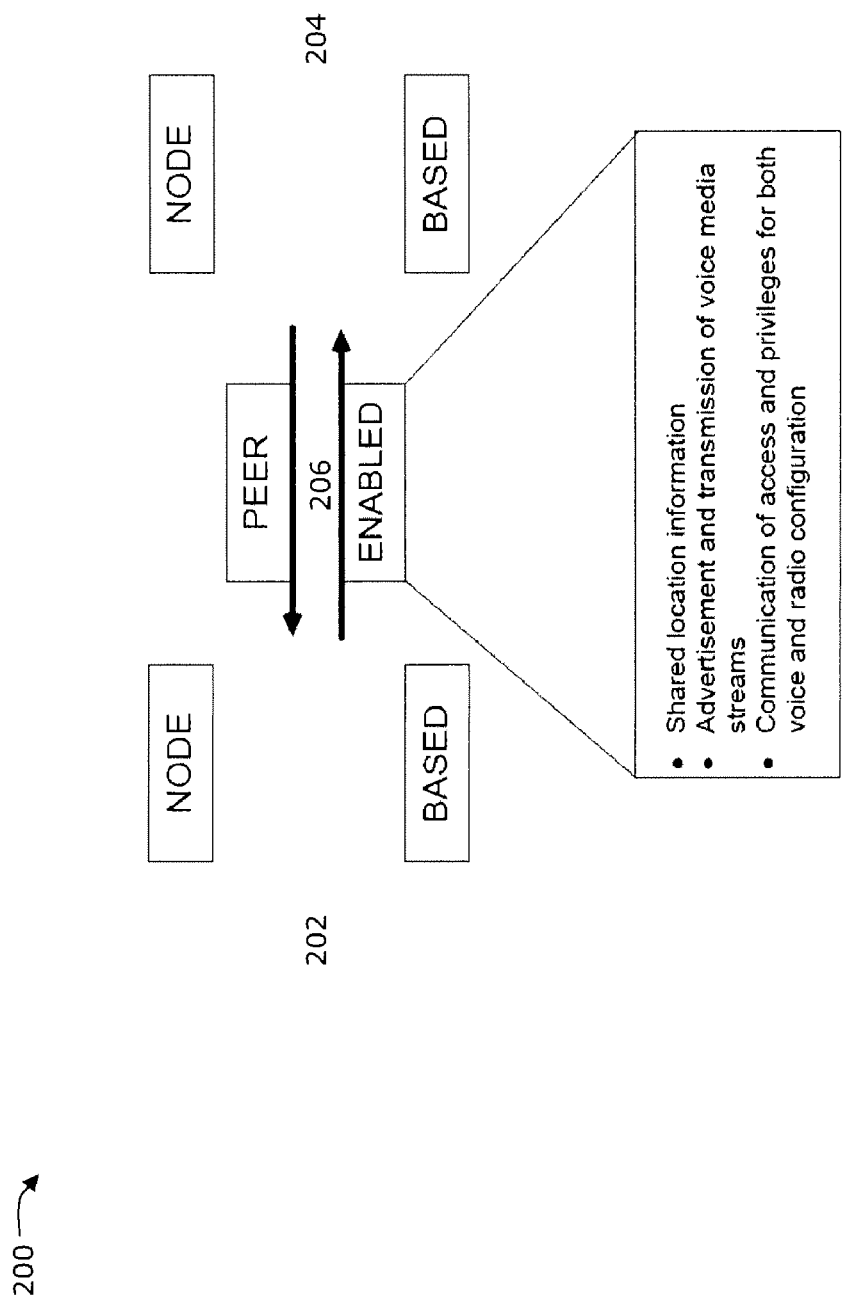
FIG. 2 shows an example of basic communication in a system using three conceptual levels as shown in FIG. 1.

FIG. 2 shows an example of basic communication in a system 200 employing at least two nodes (locations with equipment) 202 and 204, having the conceptual layer model of FIG. 1. The two nodes 202 and 204 are in communication 206 with one another at each conceptual level. At the top level, each node advertises through an advertising interface connections or streams to media sources, such as radios, telephones, video cameras, etc. At the middle level, each node communicates information regarding security, access, and administrative privileges. At the bottom level, each node uses the protocols required by any medium that facilitates communication 206. Communication between nodes is preferably peer-to-peer.

FIGS. 3-9 illustrate various aspects of using the systems, devices and methods of the present application. Although these illustrations of FIGS. 3-9 primarily illustrate military applications, the embodiments are not limited to such applications, and can be useful in a variety of situations. Various embodiments can be useful in principle in any type of communications system that employs multiple types of communication, particularly where at least one type of communication is intended to be employed in a remote location or insecure environment, for example, for field operations personnel of a geographic survey company, for police, for firefighters, for medical personnel, etc.

Figure 3:
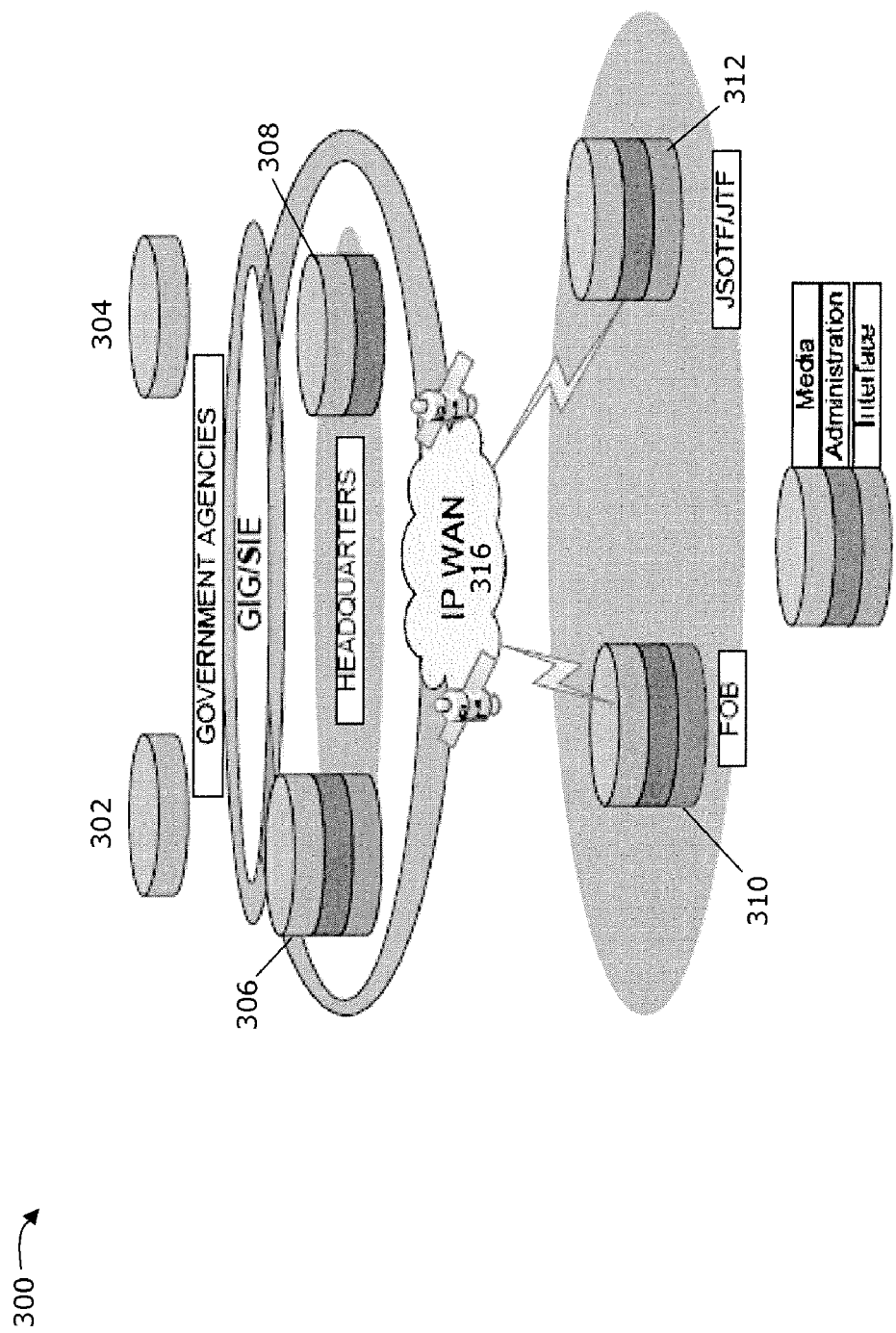
FIG. 3 shows an example communications system.

FIG. 3 shows a system 300 of the type shown in FIG. 2, having conceptual layers as shown in FIG. 1, as it can be implemented. System 300 has government agency users 302 and 304, headquarters users 306 and 308, an interne protocol wide-area network 316 (IP WAN), a forward operations base (FOB) user 310 and a joint special operations task force (JSOTF)/joint task force (JTF) user 312.

A collection of users, such as those shown in system 300, previously had a variety of different communications systems to use, and communicated in disparate ways. According to system 300, each user has access to a converged network of communications media. Although some users of system 300 may only have access to limited and specific forms of communication (such as handheld radios provided by a variety of different vendors), these limited and specific forms of communication are converged onto a network using gateway devices and methods according to the present application. This allows, in effect, headquarters users with stable locations and access to more powerful computing equipment, will have better control over and access to disparate forms of communications in the field.

In the system of FIG. 3, for example, command, administrative and technician users at headquarters (represented by users 306 and 308), have the ability to access media in the top conceptual layer, which may consist of audio from a variety different radio types and telephones in the field, video from surveillance units, remote controlled-drones and static cameras, and other sources. Users 306 and 308 also have the ability to control access privileges and security as necessary, and to reconfigure devices remotely.

External government agency users 302 and 304 may also need access to certain types of media, without needing access to all privileges associated with the communications network. Agencies 302 and 304 can, then, be provided access over a network to selected portions of the top conceptual layer.

Users 310 and 312 represent base location users in the field. These users have locations that are secure enough to have more extensive communications facilities. The base location users 310 and 312 can be connected to headquarters users over an internet protocol (IP) wide-area network (WAN) 316, that may operate by satellite, for example, to avoid the use of physical communication lines.

Figure 4:
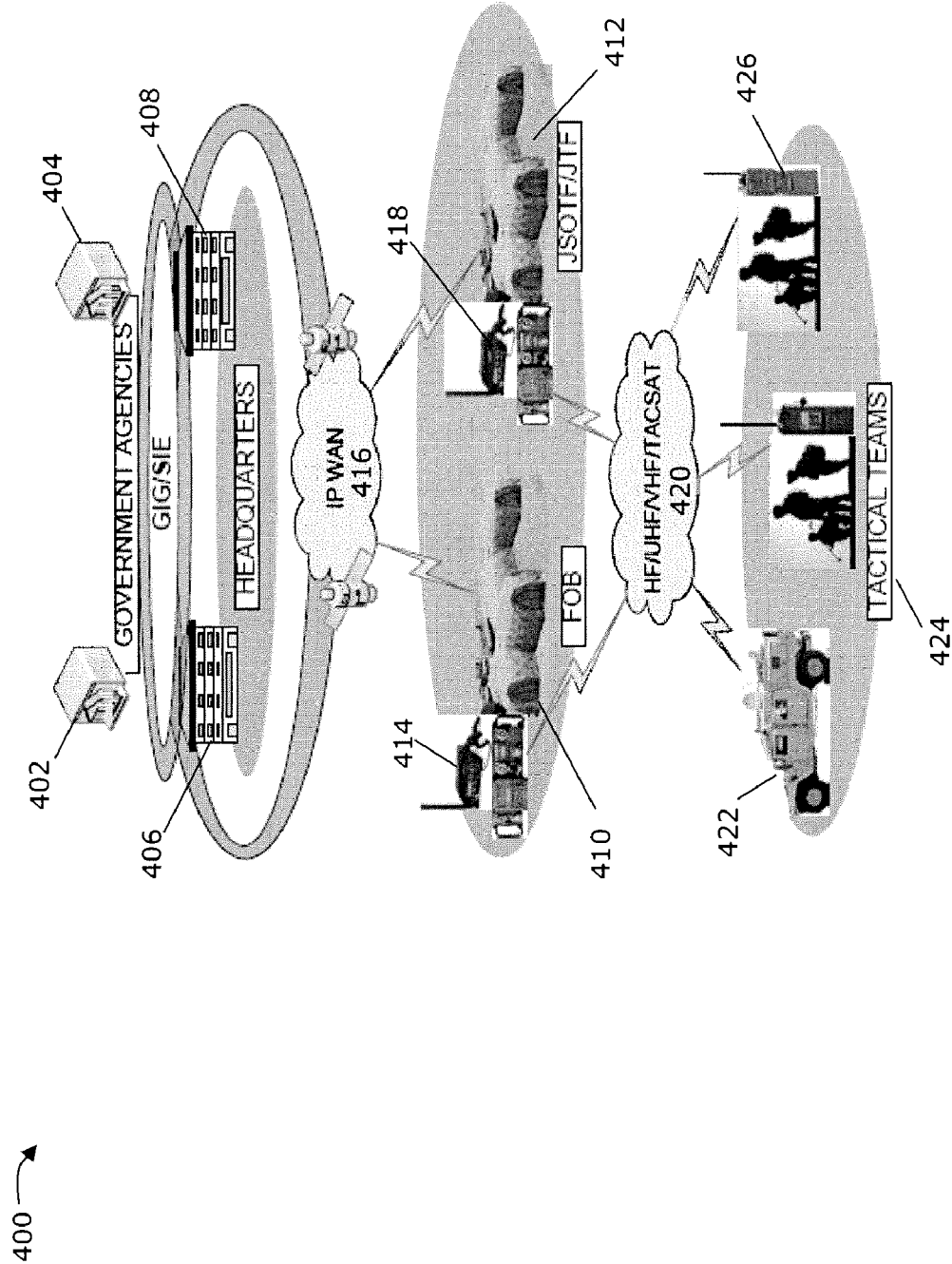
FIG. 4 shows an example communications system.

FIG. 4 expands on the system of FIG. 3, where reference number 402 corresponds to reference number 302 in FIGS. 3, 404 to 304, 406 to 306, 408 to 308, 410 to 310, 412 to 312 and 416 to 316. FIG. 4 also shows that the FOB and JSOTF/JTF have radio transceivers 416 and 418, that are in communication 420 via High Frequency (HF) radio, Ultra-High Frequency (UHF) radio, Very High Frequency (VHF) radio, the TACSAT system of satellite communications, or other suitable means, with tactical teams 422, 424 and 426. Communications with tactical teams 424 and 426 can occur via team 422, which has a vehicle capable of carrying more equipment and a longer range radio.

The system of FIG. 4 preferably has a radio over internet protocol (RoIP) capability. The radio communications are preferably converged to IP communications at the vehicle of tactical team 422, but can in principle be converged at any point in the network, including FOB 412 or JSOTF/JTF 414. The convergence of radio to IP allows, for example, users at headquarters 406 and/or 408, or users at government agencies 402 and/or 404, although they may be located far from tactical teams 424 and 426, to speak with those tactical teams through handheld radios carried by the teams. By using RoIP, for example, a user with an IP telephone at government agency 404 can have a telephone call packetized and routed to vehicle 420, where a RoIP gateway device facilitates local communication with portable radios held by tactical teams 424 and 426.

The application layer protocol for RoIP communications with other users on the system is preferably similar to Session Initiation Protocol (SIP), as explained in RFC 3261, the contents of which are hereby incorporated by reference.

Figure 5:
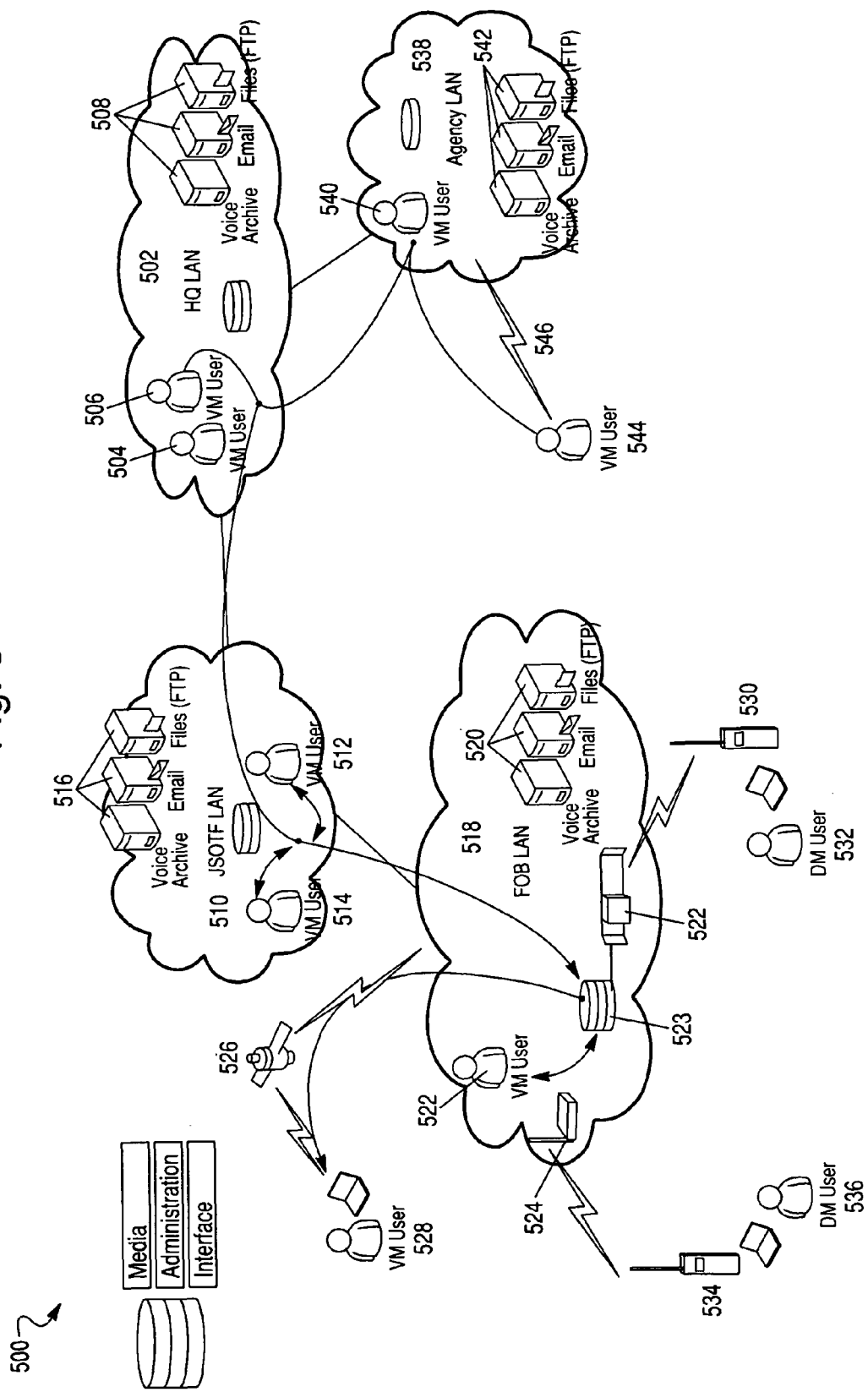
FIG. 5 describes an implementation of a converged radio over internet protocol (RoIP) network.

FIG. 5 describes an implementation of a converged RoIP network. Fig. shows various stations 502, 510, 518 and 538, each preferably having respective servers 508, 516, 520 and 542 for voice communications, email communications and file communications, wherein a server can be hardware and software, software, or a component of software. FIG. 5 also shows various field users 532 and 536, having portable radios 530 and 534. Personnel 504, 506, 512, 514, 522, and 540 at stations 502, 510, 518 and 538, and personnel 528 and 544 at locations remote from stations 502, 510, 518 and 538, are potentially in need of voice communications with field radio users 536 and 532.

Field radio users 536 and 532 are in communication via radios 534 and 530 with radios 524 and 522, respectively, which are radios of different types. These radio communications can be converged to an IP network at a radio communications gateway device 523, or at a similar device located proximate to users 636 and 630. Once converged to an IP network, radio communications can be made accessible to voice media users 522, 528, 514, 512, 504, 506, 540 and 544, via a number of intermediate communications media, which can include satellites communications (e.g., 526) or the public-switched telephone network (PSTN) 546.

Figure 6:
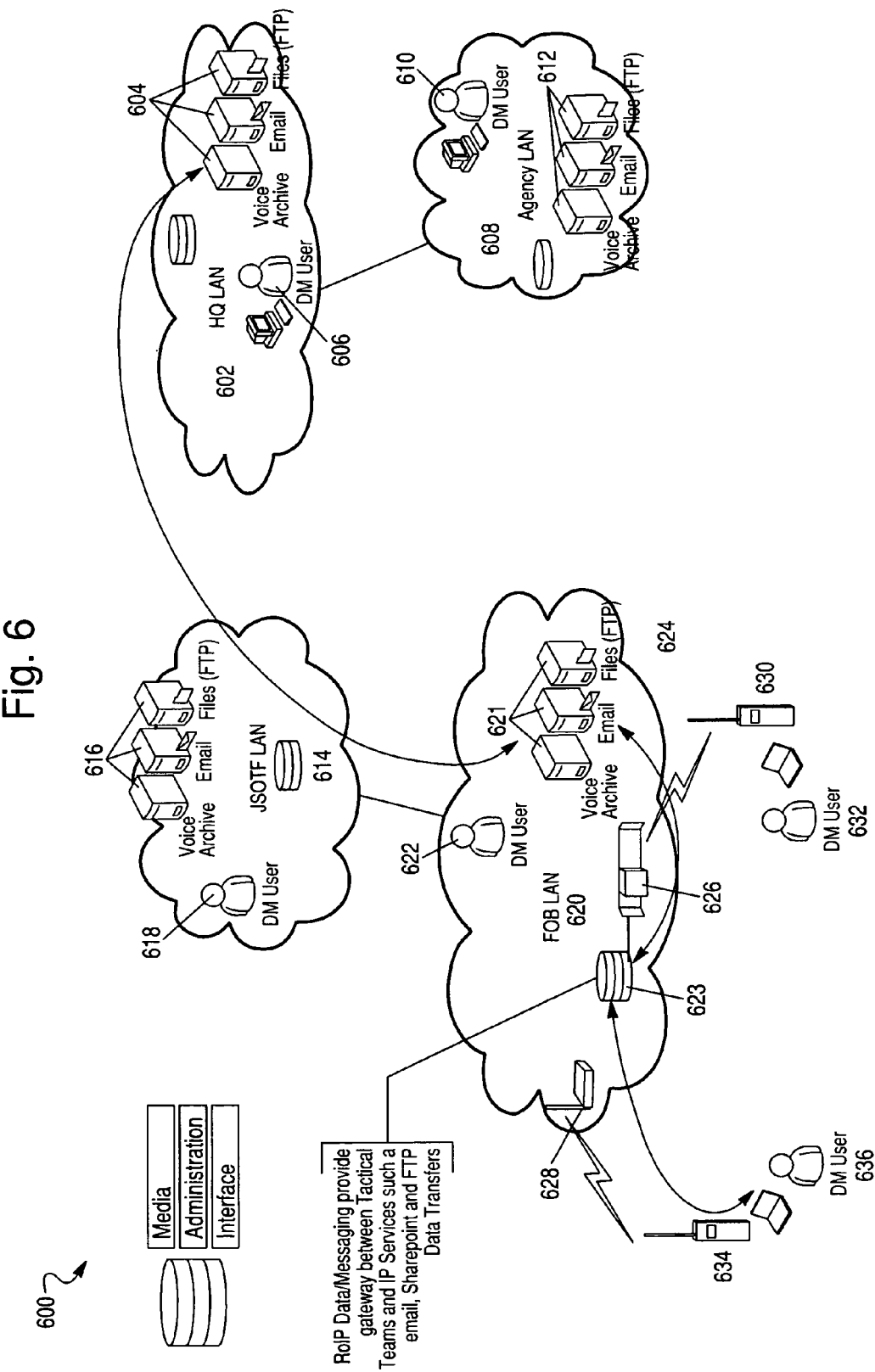
FIG. 6 illustrates a further application of the systems, methods and devices of certain embodiments in an example communications system.

FIG. 6 illustrates a further application of the systems, methods and devices of certain embodiments. FIG. 6 shows again several stations 602, 608, 624 and 620, each having respective servers 604, 612, 616 and 621 as described in relation to FIG. 5. As with FIG. 5, field users 636 and 630 use handheld radios 634 and 632 to communication with FOB radios 628 and 626, respectively, which communications are converged to an IP network at radio communications gateway device 623, or at devices proximate to users 636 and 630.

These users in FIG. 6 further have access to display devices, such as portable computers, that allow them to receive data messages, such as emails and files via their handheld radios. Such communication can take place, for example, via the Personal Digital Assistant (PDA) standards 184A or 188, which allow a display device such as a field-ready laptop to communicate (e.g., via a serial interface) with a portable radio compliant with the standard.

Data messages are sent via radio over IP to radio communications gateway devices located near the users, and then communicated to the user's display devices from the radio communications gateway devices. This allows not only voice communications over a communications channel that includes a portable radio, but also facilitates the exchange of relevant data. For example, a headquarters user may wish to speak directly with a field radio user, and at the same time send that user a new graphics file having updated map data.

Figure 7:
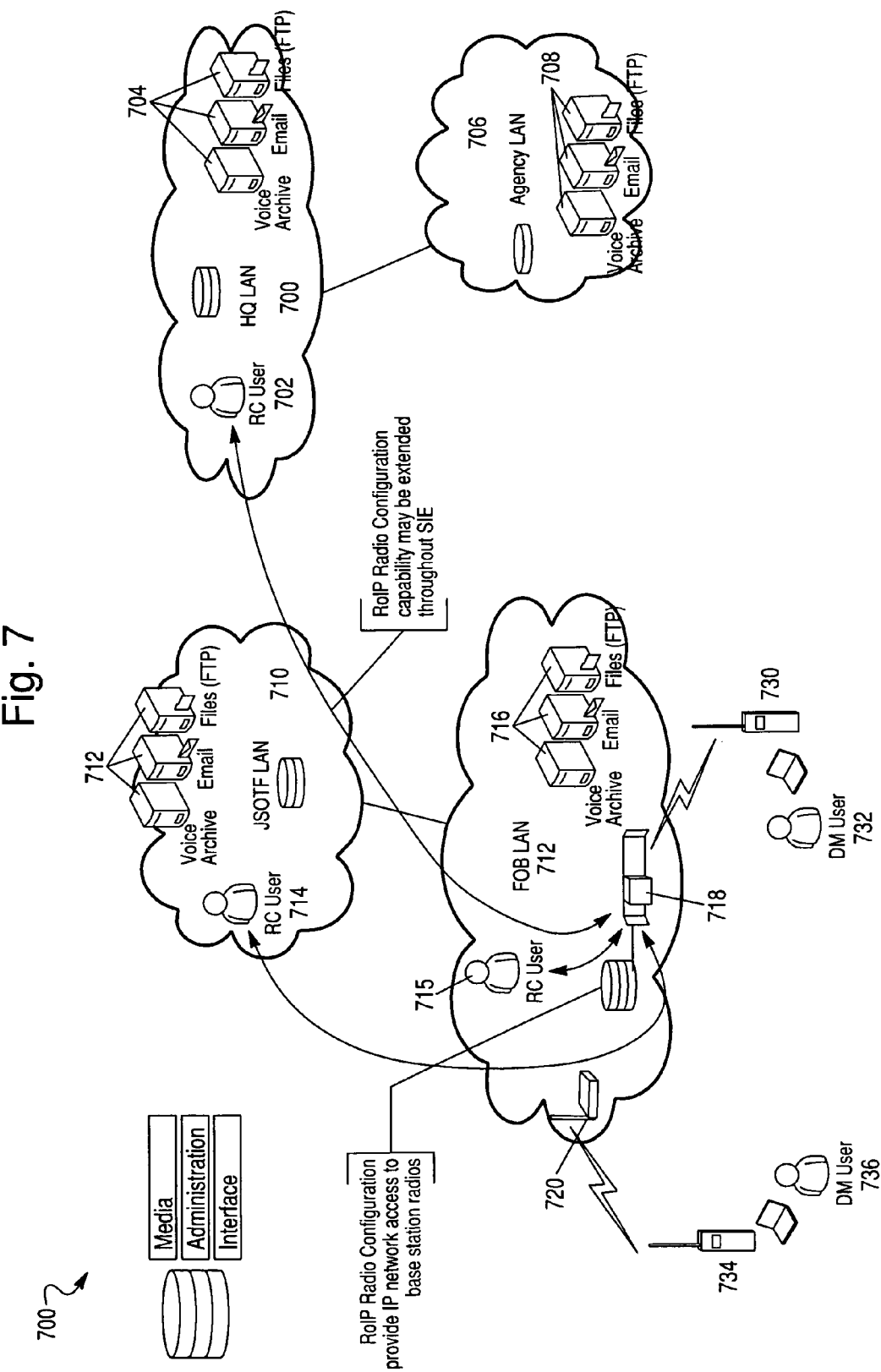
FIG. 7 illustrates yet another example communications system.

FIG. 7 illustrates yet another aspect. FIG. 7 shows stations 700, 706, 710 and 712, having servers 704, 708, 712 and 716 respectively, as well as various users 702, 714 and 715. FIG. 7 also shows field users 736 and 732, having portable radios 734 and 730 respectively, in communication with radios 720 and 718 respectively.

The various users 702, 714 and 715 have access privileges that allow them to configure portable radios 720 and 718, and optionally 734 and 730. This allows, for example, the users 702, 714 and/or 715 to change a radio's channel or security settings or to install or reconfigure software on the radio, etc. Network policies, for example, can provide access control and security for radio configuration.

Figure 8A:
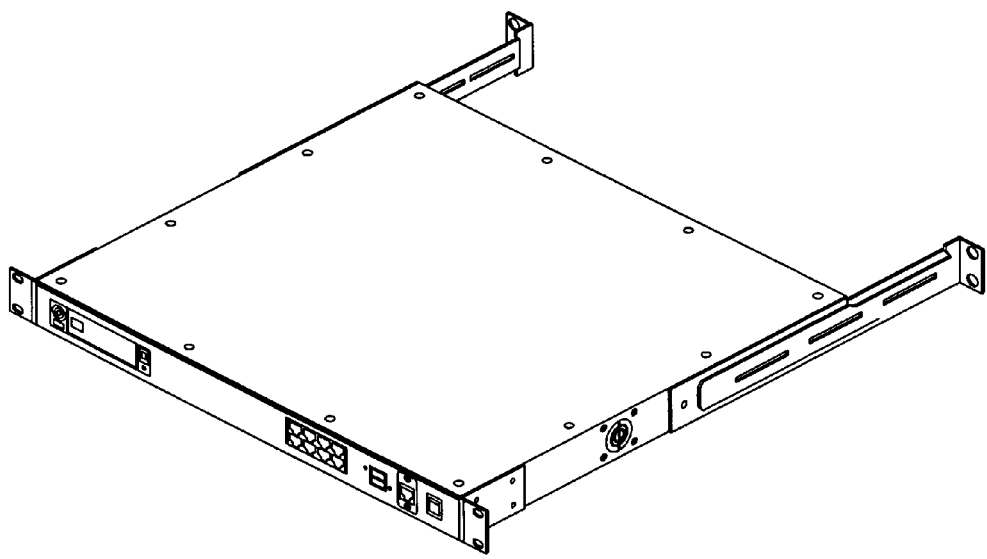
FIG. 8a is a rear perspective view of an example radio communications gateway device.

FIG. 8a is a rear perspective view of an example radio communications gateway device 800. Device 800 has a housing 802, which can be metal, plastic, or any material suitable for field use. The housing is preferably closed, and of one or more pieces joined to form a single box unit. Housing 802 has a front face 804, a back face 806, length edge 808, a height edge 810, and a depth edge 812. The dimensions of the housing preferable fit within on rack unit. The length edge is 23 inches or less, and more preferably 19 inches or less, the height edge 810 is preferably 1.75 inches or less, but can optionally be two rack units high, for example, 3.5 inches or less, and the depth edge 812 is preferably 40 inches or less and more preferably 15 inches or less, and optionally 10 inches or less.

Figure 8B:
FIG. 8b is a front-face view of an example radio communications gateway device.

Front face 804 is detailed in FIG. 8b. FIG. 8b shows a number of components and connectors that are preferably part of the radio communications gateway device and integrated into its housing. Component 814 is the front panel of a removable storage medium device, such as a flash drive. The quick removability of the device allows for quick securing of the radio communications gateway device should the environment become insecure, or should the operator need to leave the device unattended. Optionally, the storage medium can also be encrypted.

Component 816 is preferably a dual universal serial bus (USB) port, having two USB connectors. Component 818 is preferably a console port, preferably of type RJ45. Component 820 preferably comprises eight 10/100 Ethernet switch connectors. Component 822 is preferably a device power switch.

Figure 8C:
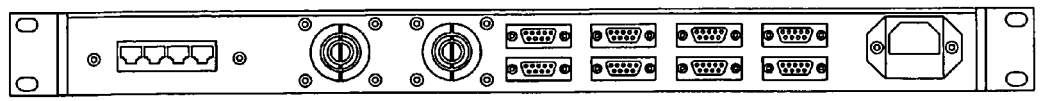
FIG. 8c is a rear face view of an example radio communications gateway device.

FIG. 8c details the rear face 806 of housing 802. Rear face 806 has component 824, which is preferably a set of four telephony connectors of type RJ11. Component 826 is preferably a device identifier, such as an encoded label. Component 828 is preferably a set of eight serial interface connectors, preferably DB-9 radio interface ports of female type. These connectors 828 may typically be used to interface to a number of radios at a forward command site, which radios in turn may be used for different purposes, such as communicating with teams in the field, communicating with a satellite communications system, or communicating with other bases or centers using line of sight or ad hoc networks.

Component 830 is preferably a power connector, for example a National Electrical Manufacturers Association compliant connector, or other connector suitable for local requirements, such as the International Electrotechnical Commission (IEC) 320-C16. The connector is preferably supplies an internal power supply rated at 10 Amps/250 AC volts.

The device 800 preferably has a weight under 10 pounds, and more preferably approximately 9.2 pounds or 8.8 pounds, where "approximately" means +/−0.25 pounds in this particular instance.

Figure 9:
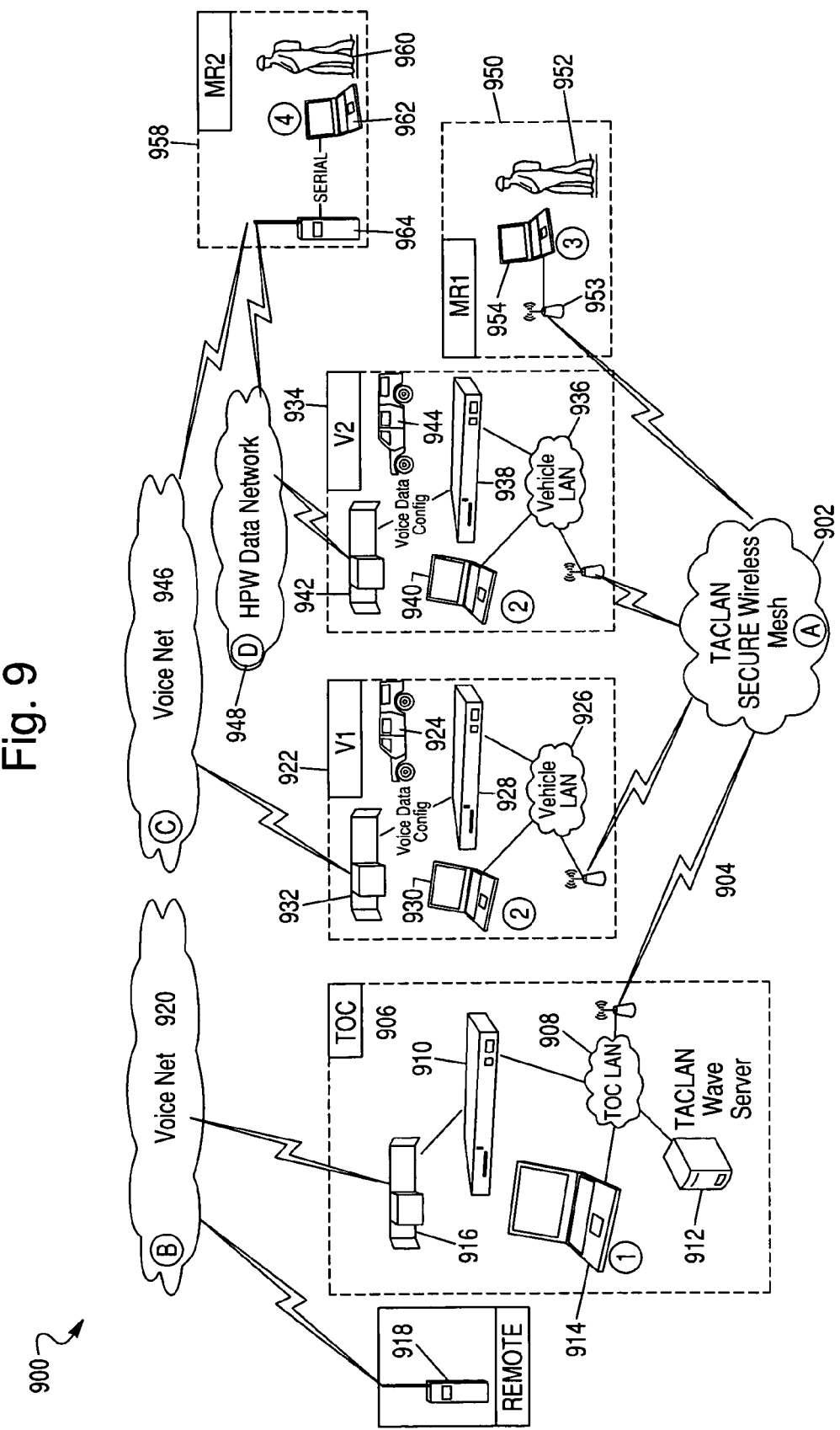
FIG. 9 illustrates potential uses of radio interface gateway devices in an RoIP network.

FIG. 9 illustrates potential uses of radio interface gateway devices in an RoIP network. FIG. 9 shows a number of wireless networks, such as ad-hoc or mesh networks 902, 920, 946, or satellite network 948. FIG. 9 also shows a number of different units in communications, for example, a tactical operations center (TOC) 906, a vehicle unit 922 having a vehicle 924, a vehicle unit 934 having a vehicle 944, personnel units 950 and 958 having personnel 952 and 960 respectively, and a remote unit 918.

Personnel unit 950 has an associated radio 953 and laptop 954. Personnel unit 958 also has an associated radio 964, which is connected with a laptop 962 computer via the radio's serial interface.

TOC 906 has an internal local area network (LAN) 908, which may be an Ethernet network, which has a server 912, a laptop computer 914, a radio communications gateway device 910, and a radio 916. The radio communications gateway device 910 converges communications via radio 916 onto a network, in this case TOC LAN 908. The radio 916 can be connected, for example, to the radio communications gateway device via one of several serial interface connectors 828 (with reference to FIG. 8), while TOC LAN 908 can be connected to one of several Ethernet connectors 820.

With reference again to FIG. 9, vehicles 922 and 934 have vehicle LANs 928 and 938, respectively, laptop computers 930 and 940, respectively, and radio communications gateway devices 928 and 938 respectively, which converge communications via radios 932 and 942 onto the respective vehicle LANs. The vehicles 922 and 934 also communicate with network 902 via a radio link. Vehicle 922 has a radio 932 in communication with Voice Net 946, while vehicle 934 has a radio 942 in communication with satellite network 948.

The convergence of radio communications via radio communications gateway devices 910, 928 and 938 allows for various users of the network to route voice and non-voice media to various users of the network, including remote users 958, 950 and remote radio 918 seamlessly. For example, it is possible for the a user having access to network 902, to use a standard telephone and, entering proper codes, access radio communications gateway device 938 on vehicle 944, and use the device 938 to operate radio 942 to speak with field unit 958 via radio 964.

As described in FIG. 8, the radio communications gateway devices optionally and preferably have a variety of connectors, that can be used in addition to those mentioned above. For example, it is preferably possible to plug in a variety of Ethernet cables, or other devices via USB or serial ports. Additional radios can be connected through serial ports, and analog telephones via telephony ports such as RJ11, etc.

Figure 10:
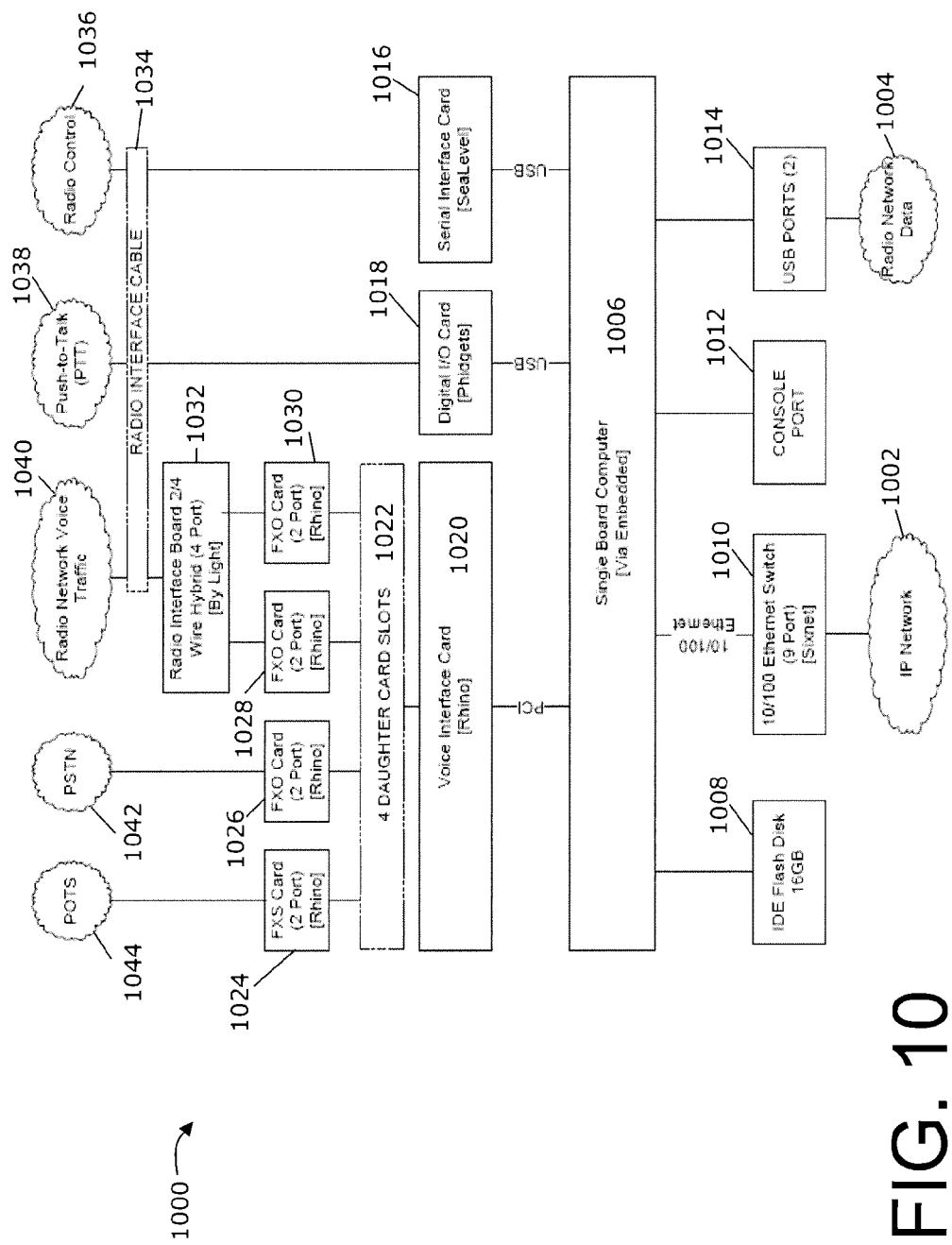
FIG. 10 describes a possible interconnectional organization of components within a housing of a radio communications gateway device.

FIG. 10 describes a possible interconnectional organization of components within housing 20 of the radio communications gateway device of FIG. 8. This is one of several suggested organizations suggested for limiting size the dimensions described with respect to FIG. 8.

FIG. 10 shows an organization of a radio communications gateway device 1000, connected to an IP network 1002, a radio network 1004, at least one radio via interfaces 1036, 1038 and 1040, a PSTN network 1042 and an analog plain-old telephone service (POTS) compatible device 1044. The latter reference numerals are depicted as clouds in FIG. 10 to indicate that their configurations may be highly variable—in principle, these devices and systems need only satisfy certain protocol.

In general, the lower side of FIG. 10 represents the rear of device 800 of FIG. 8, while the upper side of FIG. 10 represents the front of device 800, although the placement of individual components can vary.

Organization 1000 has a processor 1006, which in the drawing is shown as a single board, and which can include one or multiple integrated circuits, for example. The processor 1006 is in communication with a flash drive 1008, a network interface 1010 such as a 10/100 Ethernet switch with corresponding connectors, console port 1012 and USB ports 1014. Processor 1006 is also in communication with a Voice Interface Card 1020 over a Peripheral Component Interconnect (PCI) bus. Voice interface card 1020 has, in the example of FIG. 10, four daughter card slots 1022, which are occupied by one two-port foreign exchange subscriber (FXS) card for providing appropriate connectors and PSTN services to a connected analog telephone devices, and three two-port foreign exchange office (FXO) cards 1026, 1028 and 1030. FXO card 1026 provides two connectors for receiving incoming connections from PSTN network equipment. Boards 1024, 1026, 1028 and 1030 are of types commercially available.

FXO cards 1028 and 1030 provide two connectors each, which are connected in the organization of FIG. 10 to a Radio Interface Board, which is preferably a small footprint printed circuit board. The purpose of the radio interface board is to provide impedance matching, voltage supply, signal manipulation and signal isolation between the radios and analog telephones attached to the radio communications gateway device.

Processor 1006 is also connected in FIG. 10 over a USB connection to a Digital I/O card 1018 and over another USB connection to a Serial Interface Card 1016. Cards 1018 and 1016 are of types that are commercially available. Cards 1032, 1018 and 1016 are then mapped to radio interface cable 1034, to carry out various radio functions, such as device control, push-to-talk (PTT) and voice capabilities.

The USB connection can, in a preferred embodiment, be used to emulate a PCI connection. In some cases, an available processor board may have a limited number of PCI slots, which can not be expanded without significant expense, engineering and/or footprint consumption. In such a case, a USB to PCI converter device can be used to emulate PCI communications with processor 1006.

Figure 11:
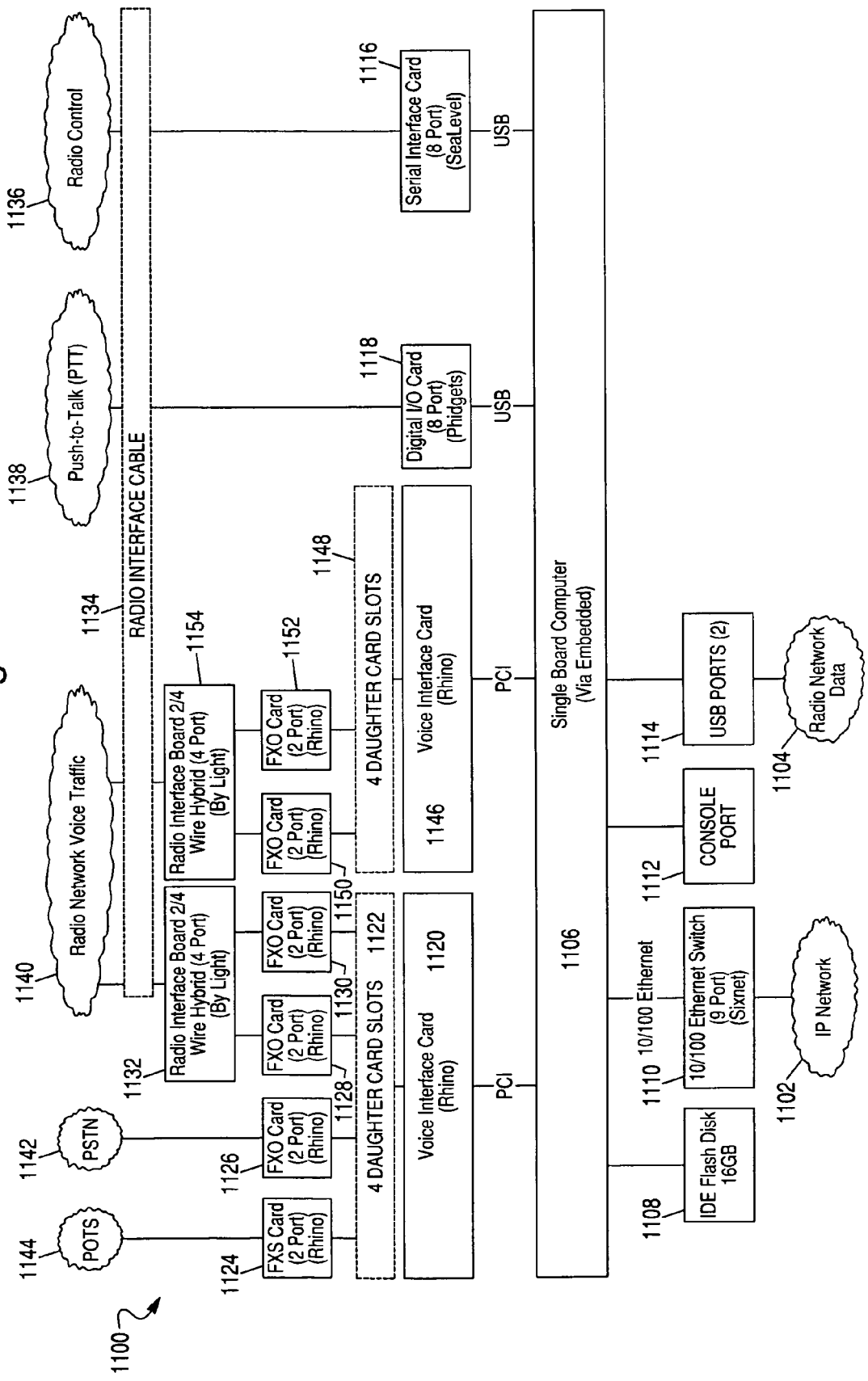
FIG. 11 describes an alternate possible interconnectional organization of components within a housing of a radio communications gateway device.

FIG. 11 illustrates an alternate internal organization. The reference numerals 1102 through 1142 correspond to the components 1002 through 1042 having the same final two digits, respectively. FIG. 11, however, shows an expanded organization with a second voice interface cart 1146, having an additional number of slots 1148. In the organization of FIG. 11, two such slots are occupied with two-port FXO cards 1150 and 1152, which are connected to a second radio interface Board to facilitate additional radio—telephony interfacing.

Figure 12:
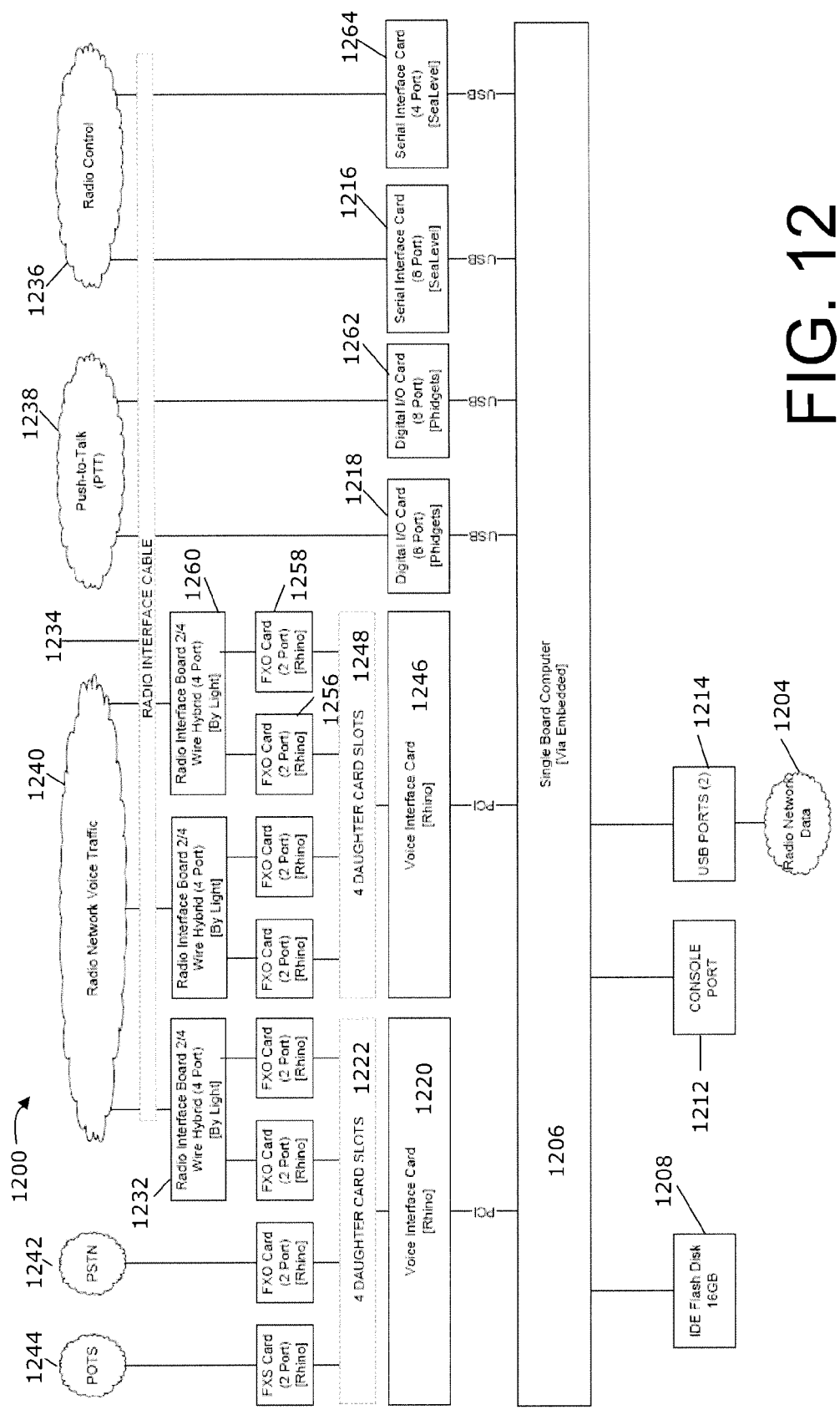
FIG. 12 describes yet another an alternate possible interconnectional organization of components within a housing of a radio communications gateway device.

FIG. 12 shows yet another possible organization 1200. The reference numerals 1104 through 1154 (except for 1110) of FIG. 11 correspond to similar parts of FIG. 12, although not all parts of FIG. 12 have been correspondingly labeled. FIG. 12 shows additional components, such as two-port FXO cards 1256 and 1258, which occupy two of the card slots 1248, and which interface with Radio interface board 1260, to provide additional radio interface capabilities. Furthermore, additional Digital I/O and Serial Interface cards 1262 and 1264 respectively, are provided.

Figure 13:
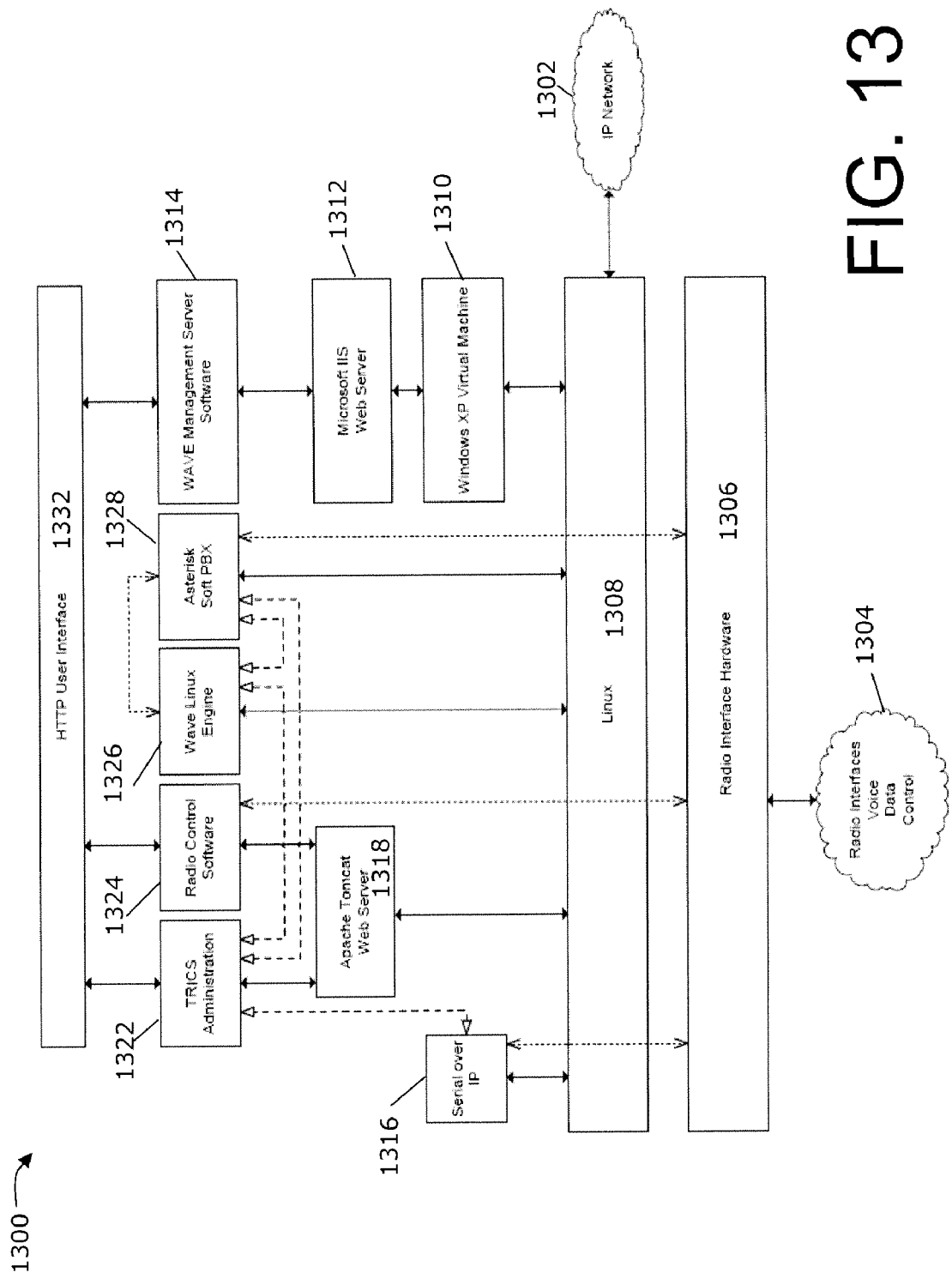
FIG. 13 depicts a possible software/hardware architecture of a radio communications gateway device.

FIG. 13 depicts a possible software/hardware architecture of a radio communications gateway device, such as the one depicted in FIG. 8. FIG. 13 shows the device connected to an IP Network 1302, such as the Internet or a private IP network. FIG. 13 further shows the device connected to radio interfaces 1304, which allows access to a radio. The software components of FIG. 13 include a LINUX-based operating system, 1308, a Microsoft WINDOWS-based virtual machine 1310 that runs within the LINUX operating system 1308, a Microsoft Internet Information Server 1312 that runs within the virtual machine 1310, a media switch management server 1314, a Web server 1318, a serial over IP component 1316, a Web-based administration component 1322, Web-based radio control software 1324, media switch engine 1326, PBX software 1328, and a Web-based user interface 1332.

The architecture of FIG. 13 uses a LINUX-based operating system 1308, in this embodiment described as a LINUX operating system. The LINUX platform provides the kernel, or lowest-level software interface to hardware. The LINUX platform also facilitates communication between various components shown in FIG. 13, which are not all able to communicate with one another natively. To solve this problem, each component's internet protocol functionality is used to communicate via the LINUX IP stack using the loopback address and a further identifier appropriate for the target of the communication. Each of the components communicating via this method opens a socket to a local bus, having the loopback address and a respective port number. The LINUX IP stack associates each socket address with a target application (including itself), and redirects packets to their intended destination. The LINUX IP stack is thus the hub in a hub and spoke architecture. This convenient mechanism for communication assists in the minimization of communication facilities.

LINUX operating system 1308 also supports software and hardware that perform the digitization of incoming analog audio streams, and their separation into packets for communications on an IP network. These packets are managed by media switch software 1326 and media switch management server 1314. The media switch software 1326 and management server 1314 are, in this example, implemented through WAVE software currently available from Twisted Pair communications.

The management server 1314 is currently only available via Microsoft's Active Serve Pages technology, which requires a Microsoft WINDOWS-based platform, while the media switch component 1326 is available on a LINUX platform. Wave software requires a management server to be reachable. A management server such as server 1314 is typically in a trusted and physically secure environment. In the embodiment of FIG. 13, however, the management server 1314 is provided on a radio communications gateway device, which may be in a field environment. The server is provided in the radio communications gateway device in order to provide for peer-to-peer communications with other nodes within a communications network, as opposed to client-server or master-slave communications that might have unacceptably long delays over a network.

To avoid the use of a separate physical component running a separate operating system, the media switch management server 1314 is executed using Active Server Pages inside a Microsoft WINDOWS virtual machine, which in turn facilitates Microsoft Internet Information Server and allows Active Server Pages to function. This makes the need for a separate machine running a WINDOWS platform unnecessary, and makes security and error-handling easier within the overall context of a LINUX platform.

Administration functions are performed via a Web interface 1332. The Web interface is facilitated by a Web server 1318, which is preferably implemented as an Apache Tomcat server. The Web interface provides not only for configuration of the radio communications gateway device 1300, but also for components, for example radios, connected thereto.

This Web-to-radio functionality is performed using serial-over-IP component 1316, which is a back-end communication tool that is configured to communicate with radios of various types over a serial or other interface. That is, serial over IP component 1316 contains logic that carries out manufacturer specific control over a radio. For example, the protocol for issuing a command to change a radio channel, or to key a radio, may be different from manufacturer to manufacturer, or even different from device-to-device within the same manufacturer's product line. Preferably, these device-specific controls are abstracted to standardized controls, which are provided to the user via a Web-interface. The user sees only options relating to the changing of a channel for example, and does not see the specific protocol necessary to carry this channel change out for any particular radio.

Figure 15:
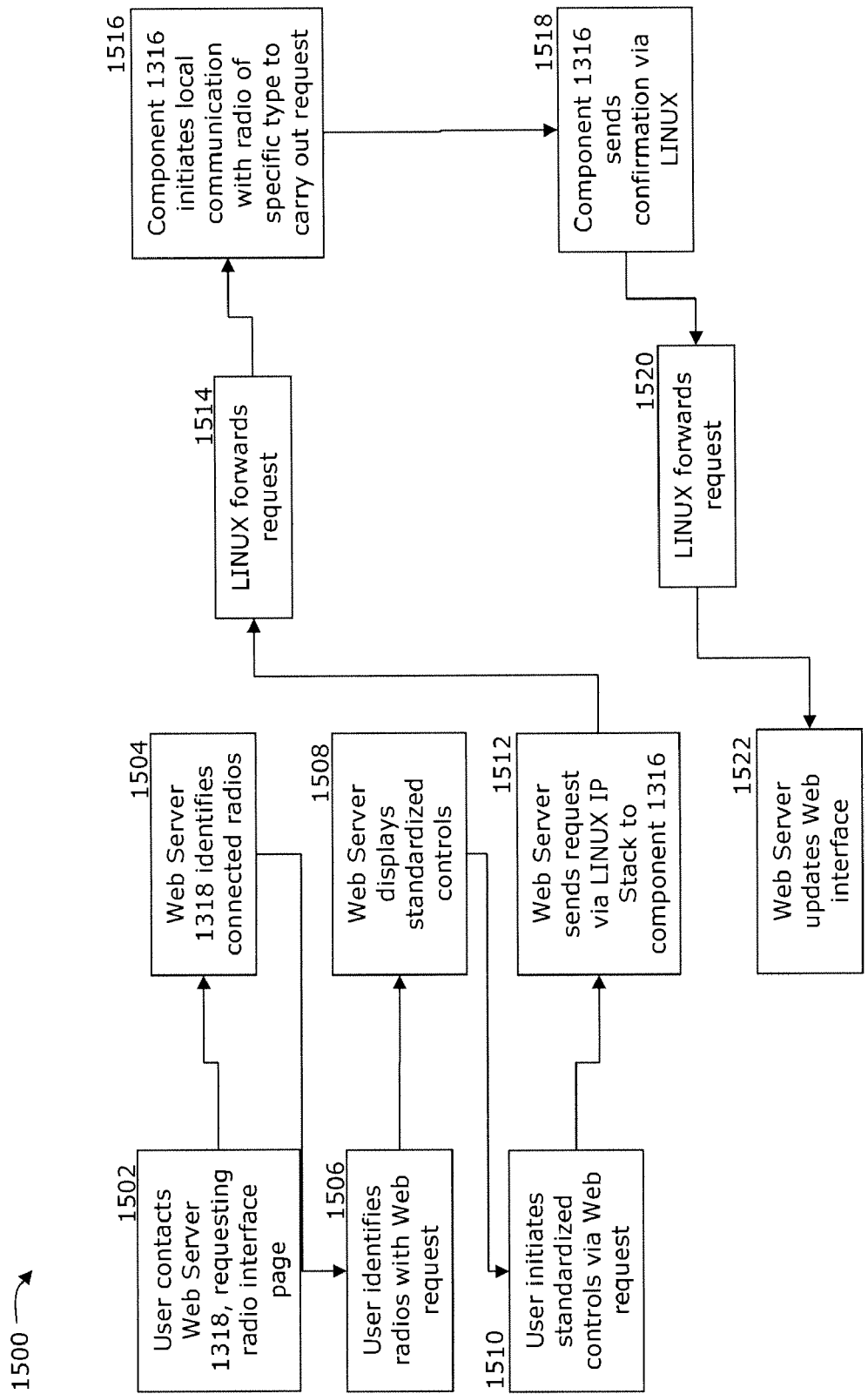
FIG. 15 is a flow diagram showing administrative communication by a user through an example radio communications gateway interface.

Thus, control over many different types of radios can be implemented as shown in FIG. 15. FIG. 15 is a flow diagram 1500 showing administrative communication by a user through the radio communications gateway interface 1300. Assuming an authenticated user with sufficient access privileges has been identified, the user is allowed to make a request to server 1318 at step 1502. The request can, for example, be an hypertext transport protocol (HTTP) or secure HTTP (HTTPS) request to list available radios to configure. At step 1504, the Web Server 1318 receives the request, and identifies connected radios using a local data structure, such as a database or file, or performs a query via the operating system 1302 to identify connected radios.

At step 1506, the user receives a Web page listing available radios, which may be limited by the user's access privileges. The user identifies a radio of interest, and communicates this to the Web server 1318. At step 1508, the Web Server 1318 sends a Web page with standardized controls. At step 1510, the user sends a Web request formed by using the standardized controls, requesting that an operation be performed on a radio local to the radio communications gateway device. At step 1512, the Web server 1318 receives the request, and formulates an internal request to a socket, that is directed via the LINUX IP stack at step 1514, in a manner described above. Component 1316 receives the request via the LINUX IP stack at step 1516, and translates the abstract command to a command that can be understood by the target radio. Component 1316 then uses LINUX operating system 1514 to control a hardware serial interface to communicate with the target radio, using that radio's required protocol. At step 1518, component 1316 sends a confirmation that the procedure has been carried out via the LINUX IP stack. The LINUX IP stack at step 1520 forwards the confirmation to Web server 1318 at step 1522, which may update its internal data store and send an updated Web page to the user.

One advantage of the above-outlined administrative mechanisms is that control over the radio during configuration is maintained local to the radio. This means that network latency will not affect configuration. For example, some radios may require request/response interaction for specific commands to be carried out, and network latency can cause timeouts that prevent configuration. Using the organization of FIG. 13 and the method of FIG. 15, this difficulty can be largely avoided.

Figure 17:
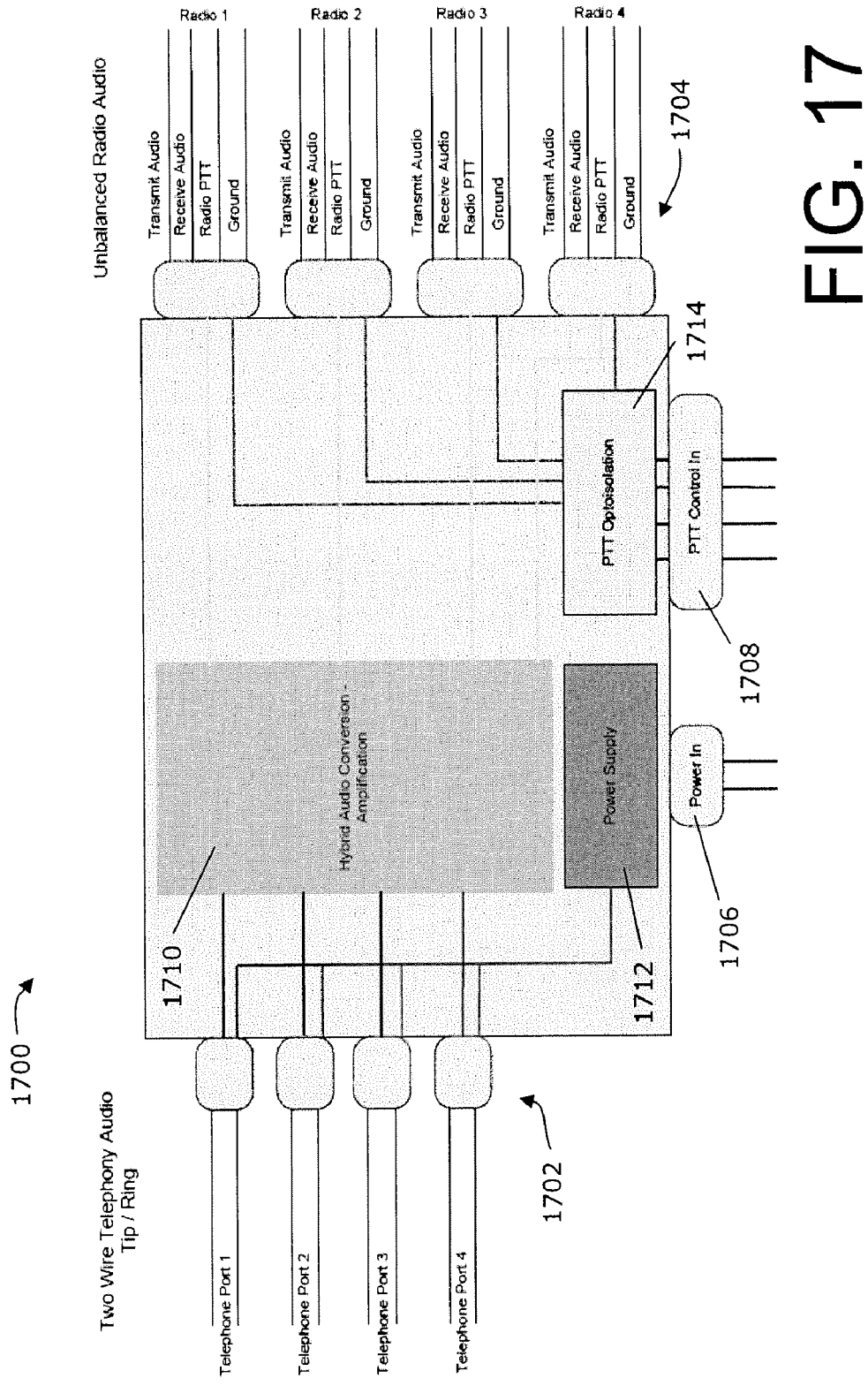
FIG. 17 is a block diagram of a radio—telephony interface board according to one embodiment.

FIG. 17 is a block diagram showing an example Radio Interface Board 1700 that could correspond to, for example, board 1032 of FIG. 10. The board 1700 has a plurality of telephone ports 1702, a plurality of radio ports 1704, a power supply connector 1706, a Push-To-Talk (PTT) connector 1708, a hybrid audio conversion and amplification Nock of circuits 1710, a power supply Nock 1712, and a PTT Optoisolation Nock 1714. The purpose of the board 1700 is to interface one or more portable radio devices with one or more telephony devices, and in particular, to interface voltage, impedance, signal levels, and signal composition.

A typical portable radio may operate with single ended audio. The signal is carried by a potential function on a single conductor, measured as a voltage relative to ground, rather than relative to another potential function. There is one conductor for transmitted signals and one conductor for received signals. The standard telephone service, in contrast, uses a composite signal with typically four conductors. Transmitted data is conveyed by a pair of wires and received data is conveyed by a pair of wires.

Figure 16:
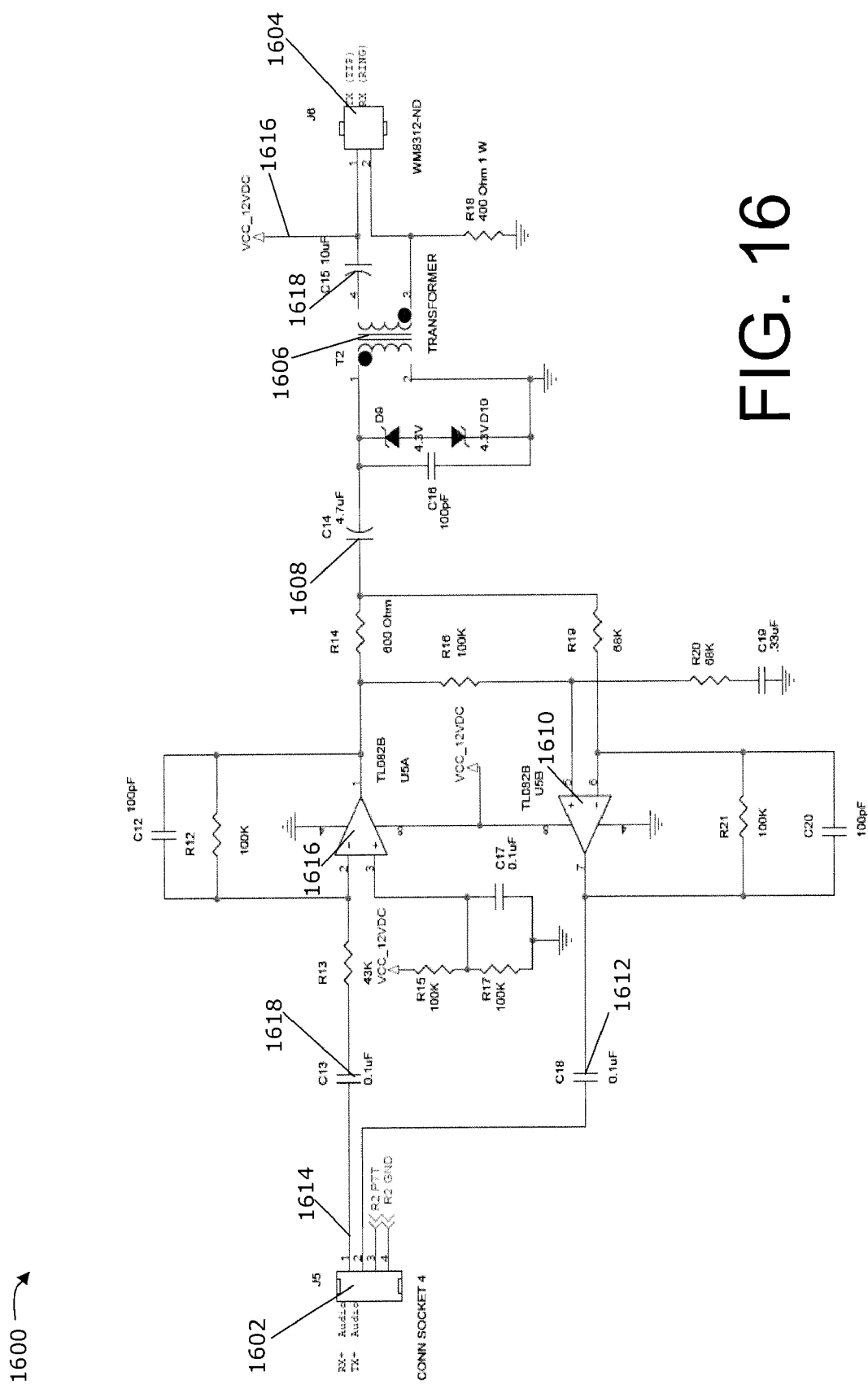
FIG. 16 illustrates a circuit diagram for a hybrid audio conversion and amplification block according to one embodiment.

FIG. 16 illustrates a circuit diagram corresponding to one interface, within the hybrid audio conversion and amplification block 1710 of FIG. 17, between a radio device and a telephony device. The interface circuit 1600 of FIG. 16 includes a radio connector circuit 1602 and a telephony connector circuit 1604, which in this example can be a PCI telephony board. The interface circuit 1600 uses a hybrid circuit to separate transmit and receive data for the radio and combine the radio's data back into a composite signal for the telephony board. In this process the high impedance from the telephony board is matched via a transformer to the usually lower impedance of the radio. The signals are then applied to a dual operational amplifier circuit that separates the two audio paths and amplifies the separate signals to compensate for loss in the conversion process. This action culminates with two separate signals that were once one, corrected impedance and levels that are matched to their corresponding interfaces. The service also includes a DC Loop for control signaling. The DC portion of the signal is used to indicate call status (e.g., in progress"), off/on hook and ringing. The telephony protocol is dissimilar to radio protocol, and these two protocols call for an interface to work together.

Signals transmitted by the connector circuit 1604 are matched in impedance and isolated by transformer 1606. The signal then passes through an audio coupling capacitor 1608, which filters the signal, and is fed to the negative terminal of operational amplifier 1610. The operational amplifier 1610 amplifies the signal due to the trans-hybrid loss in the impedance balancing network. Once the signal is amplified it is passed through another coupling capacitor 1612 and applied to the radio input of connector circuit 1602.

For information sent from the radio to the telephone, the receive audio from the radio is applied to pin 2 of operational amplifier 1616 via the audio coupling capacitor 1618. The signal is amplified by operational amplifier 1616 to compensate for the loss of the balancing network. The amplified signal is applied to the impedance matching circuit incorporating transformer 1606, and then on the PCI telephony board.

The connector circuit 1604, when embodied as a PCI telephony board, is configured to expect a 12V DC applied to its input. The 12V DC is a control signal that indicates to the PCI telepohony board that there is a call in progress. Thus, in the board 1600, a 12V DC supply is supplied to the PCI telephony board 1604 by injecting it on pin 1 of board 1604. To protect the remainder of radio interface board 1600 from the +12V DC, capacitor 1618 blocks the DC voltage but passes the audio signal.

Figure 18:
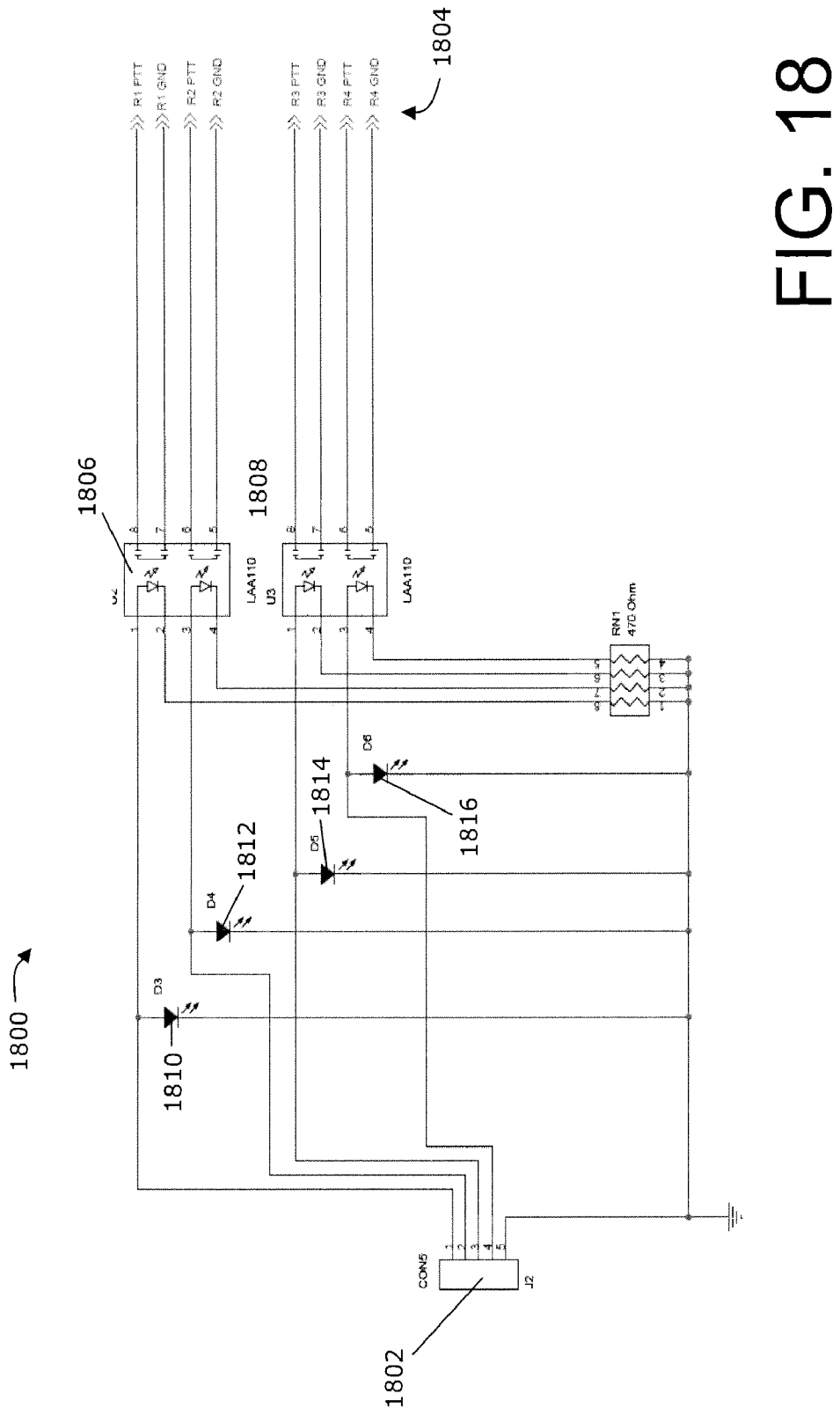
FIG. 18 shows an optoisolation circuit diagram according to an embodiment.

FIG. 18 shows an optoisolation circuit diagram 1800 for PTT functionality for connected radios, corresponding to block 1714 in FIG. 17. The diagram 1800 has a PTT control interface 1802, PTT output wires 1804, optical coupling circuits 1806 and 1808, and light emitting diodes 1810, 1812, 1814 and 1816. The PTT control interface 1802 transmits signals (received, e.g., from a processor that in turn has received an instruction from another communications device) that indicate that the PTT of a radio should be engaged. Output signals 1804 comprise PTT (signal) and ground pairs, for up to four radios in this particular configuration.

When a PTT engage signal is received and placed on a PTT control line, it activates a corresponding one of light-emitting diodes 1810, 1812, 1814 or 1816, and engages a respective optical coupling circuit 1806 or 1808. Each of the optical coupling circuits 1806 and 1808 are embodied as dual circuits, meaning that two independent optical couplings are possible, and are preferably embodied as fast switching OPTOMOS TTL relays. The optical coupling serves to switch PTT functionality in attached radios, but prevents current from flowing between the PTT interface of the attached radios and the remaining circuitry, to prevent, e.g., current loops from building where the ostensible ground terminals are not at the same potential.

Although the foregoing is described in reference to specific embodiments, it is not intended to be limiting or disclaim subject matter. Rather, the invention as described herein is defined by the following claims, and any that may be added through additional applications. The inventors intend no disclaimer or other limitation of rights by the foregoing technical disclosure.

What is claimed is:

1. A radio communications gateway device, comprising:
    a housing comprising a plurality of types of integrated connectors, the connectors including at least two telephony port connectors, at least one general-purpose serial port connector, at least four network port connectors, and at least four radio interface port connectors; wherein each of the connectors is configured to facilitate communication signals;
    at least one processor; the at least one processor configured to execute instructions recorded in a memory, such that a first communications medium interfacing with one type of connector can communicate with a second communications medium interfacing with a second type of connector;
    wherein the housing fits within one rack unit; and
    wherein the radio communications gateway device weighs less than 15 pounds;
    wherein the processor is provided on a board comprising a fixed number of PCI slots and a fixed number of USB slots, and wherein a USB-PCI emulator is connected to at least one of the USB slot.
2. The device of claim 1, which weighs less than 9 pounds.
3. The device of claim 1, further comprising a removable persistent storage device.
4. The device of claim 1, further comprising a radio telephony interface comprising an impedance-matching circuit and an amplification circuit.
5. A radio communications gateway device, comprising:
    a housing comprising a plurality of types of integrated connectors, the connectors including at least two telephony port connectors, at least one general-purpose serial port connector, at least four network port connectors, and at least four radio interface port connectors; wherein each of the connectors is configured to facilitate communication signals;
    at least one processor; the at least one processor configured to execute instructions recorded in a memory, such that a first communications medium interfacing with one type of connector can communicate with a second communications medium interfacing with a second type of connector;
    wherein the housing fits within one rack unit; and
    wherein the radio communications gateway device weighs less than 15 pounds;
    wherein the housing fits within a rack unit having a height of about 1.75 inches and a width of about 23 inches or less.
6. The device of claim 5, wherein the width of the rack unit is about 19 inches or less.
7. The device of claim 6, wherein the connectors include at least four telephony port connectors, at least two USB connectors, at least eight network port connectors, at least four radio interface port connectors, and at least one console port connector.
8. The device of claim 6, wherein the connectors include at least four telephony port connectors, at least two USB connectors, at least eight network port connectors, at least eight radio interface port connectors, and at least one console port connector.
9. The device of claim 6, wherein the instructions comprise a LINUX-based operating system.
10. The device of claim 9, wherein the instructions further comprise a virtual machine configured to run a WINDOWS-based operating system.
11. The device of claim 10, wherein the instructions further comprise a management server that is configured to run on a WINDOWS-based operating system.
12. The device of claim 10, wherein the instructions further comprise a Web server component configured to operate on the WINDOWS-based operating system configured to run in the virtual machine.
13. The device of claim 9, wherein the instructions further comprise a Web server component configured to operate on the LINUX-based operating system.
14. The device of claim 13, wherein the Web server configured to run on the LINUX-based operating system is further configured to provide a user interface that presents an abstraction of a radio control interface.
15. The device of claim 14, wherein the Web server configured to run on the LINUX-based operating system is further configured to communicate, via the LINUX-based operating system, with a radio control module that is configured to translate information relating to the abstraction of a radio control interface to the requirements of a specific radio control interface.
16. The device of claim 9, wherein the instructions further comprise at least two additional components in socket-based communication via a LINUX-based IP stack.
17. The device of claim 5, wherein the rack unit has a depth of about 40 inches or less.

18. A radio communications gateway device, comprising:
a housing comprising a plurality of types of integrated connectors, the connectors including at least two telephony port connectors, at least one general-purpose serial port connector, at least four network port connectors, and at least four radio interface port connectors; wherein each of the connectors is configured to facilitate communication signals;
at least one processor: the at least one processor configured to execute instructions recorded in a memory, such that a first communications medium interfacing with one type of connector can communicate with a second communications medium interfacing with a second type of connector;
wherein the housing fits within one rack unit;
wherein the radio communications gateway device weighs less than 15 pounds; and
a radio telephony interface comprising an impedance-matching circuit and an amplification circuit;
wherein the radio telephony interface further comprises an isolation circuit for isolating a ground terminal configured to be attached to a radio.

19. A method of manufacturing a radio communications gateway device, comprising:
providing a housing comprising a plurality of types of integrated connectors, the connectors including at least two telephony port connectors, at least one general-purpose serial port connector, at least four network port connectors, and at least four radio interface port connectors; wherein each of the connectors is configured to facilitate communication signals;
providing at least one processor; the at least one processor configured to execute instructions recorded in a memory, such that a first communications medium interfacing with one type of connector can communicate with a second communications medium interfacing with a second type of connector;
wherein the housing fits within one rack unit; and
wherein the radio communications gateway device weighs less than 15 pounds;
wherein the at least one processor is provided on a board comprising a fixed number of PCI slots and a fixed number of USB slots, and wherein a USB-PCI emulator is connected to at least one of the USB slot.

20. The method of claim 19, wherein the housing fits within a rack unit having a height of about 1.75 inches and a width of about 23 inches or less.

21. The method of claim 19, further comprising:
providing a radio telephony interface comprising an impedance-matching circuit and an amplification circuit;
wherein the radio telephony interface further comprises an isolation circuit for isolating a ground terminal configured to be attached to a radio.

* * * * *